(12) United States Patent
Yang et al.

(10) Patent No.: US 7,006,512 B2
(45) Date of Patent: Feb. 28, 2006

(54) APPARATUS AND METHODS FOR MANAGING QUEUES ON A MOBILE DEVICE SYSTEM

(75) Inventors: Shuowen Yang, Sunnyvale, CA (US); Luosheng Peng, San Jose, CA (US)

(73) Assignee: InnoPath Software, Inc,, Sunnyvale, CA (US)

( * ) Notice: Subject to any disclaimer, the term of this patent is extended or adjusted under 35 U.S.C. 154(b) by 914 days.

(21) Appl. No.: 09/781,591

(22) Filed: Feb. 8, 2001

(65) Prior Publication Data

US 2002/0105924 A1    Aug. 8, 2002

(51) Int. Cl.
*H04L 12/54*    (2006.01)

(52) U.S. Cl. ...................... 370/413; 370/429

(58) Field of Classification Search ........ 370/412–421, 370/428, 429, 444, 463
See application file for complete search history.

(56) References Cited

U.S. PATENT DOCUMENTS

| | | | | |
|---|---|---|---|---|
| 5,500,858 A | * | 3/1996 | McKeown | 370/412 |
| 5,621,727 A | * | 4/1997 | Vaudreuil | 370/401 |
| 5,838,915 A | * | 11/1998 | Klausmeier et al. | 709/215 |
| 6,023,722 A | | 2/2000 | Colyer | |
| 6,091,709 A | * | 7/2000 | Harrison et al. | 370/235 |
| 6,304,906 B1 | | 10/2001 | Bhatti et al. | |
| 6,539,020 B1 | * | 3/2003 | Sabey et al. | 370/401 |
| 6,650,651 B1 | * | 11/2003 | Meredith et al. | 370/412 |
| 6,763,520 B1 | * | 7/2004 | Seeds | 718/101 |
| 6,816,458 B1 | * | 11/2004 | Kroon | 370/235 |
| 2001/0040887 A1 | | 11/2001 | Shtivelman et al. | |

* cited by examiner

*Primary Examiner*—Ricky Ngo
*Assistant Examiner*—Duc Duong
(74) *Attorney, Agent, or Firm*—PatentEsque Law Group, LLP; Roxana H. Yang

(57) ABSTRACT

An exemplary method for managing requests in a mobile device system comprises the steps of assigning a priority to each queue in a set of priority queues, inputting requests into the set of priority queues based on a priority associated with each request, merging multiple requests in the set of priority queues into a merged request based on priorities associated with the multiple requests and a destination for the multiple requests, and sending the merged request to a request queue for a connection in a connection pool for the destination.

18 Claims, 5 Drawing Sheets

APPARATUS AND METHODS FOR MANAGING QUEUES ON A MOBILE DEVICE SYSTEM

FIELD OF THE INVENTION

This invention relates to apparatus and methods for managing queues. In particular, this invention relates to apparatus and methods for managing queues on a mobile device system.

BACKGROUND OF THE INVENTION

When transferring data through a typical client-server network, connections between a client and a server have to be opened and closed through a handshaking process (e.g., in a TCP/IP based data transmission network) or a login/logout process (e.g., in a database connection). Both the handshaking and the login/logout processes undesirably increase traffic. This traffic increase is especially problematic in networks having limited resources, such as wireless networks.

Queuing systems are generally used to improve traffic efficiency in a network. In general, queuing systems can be classified into two categories: single station queuing systems and queuing networks. Generally, a single station queuing system (or a node) comprises a queuing buffer and one or more servers. A server typically can only serve one request at a time; thus, such a server is always either "busy" or "idle." If all servers are "busy" upon receipt of a new request, the new request is buffered when queue space is available to await its turn. Generally, each request in the buffer is serviced in accordance with a scheduling discipline.

A queuing network typically comprises multiple station queuing systems (or nodes) that may be connected to each other. Thus, requests can be transferred between station queuing systems within the queuing network to speed up the servicing process. As a result, queuing networks are generally more efficient than a single station queuing system. Efficient use of queuing networks, however, require more complex queue management techniques.

Thus, it is desirable to provide apparatus and methods for providing an efficient queue management system for use in a queuing network.

SUMMARY OF THE INVENTION

An exemplary method for managing requests in a mobile device system comprises the steps of assigning a priority to each queue in a set of priority queues, inputting requests into the set of priority queues based on a priority associated with each request, merging multiple requests in the set of priority queues into a merged request based on priorities associated with the multiple requests and a destination for the multiple requests, and sending the merged request to a request queue for a connection in a connection pool for the destination. In an exemplary embodiment, the merging step includes the steps of multiplexing the multiple requests and selectively building the merged request based on the multiplexing. In one embodiment, the sending includes the step of sending a dummy request to extend the connection duration with the destination. In another embodiment, the sending step includes the steps of calculating a total processing time of each request queue for each connection in the connection pool and sending a next request into a request queue having the lowest total processing time in the connection pool.

In one embodiment, the exemplary method further comprises the steps of assigning a high priority to a request if the request is user initiated and assigning a low priority to a request if the request is not user initiated. In another embodiment, the exemplary method further comprises the steps of initiating a sampling process to sample all requests, compiling a first list of frequently requested destinations based on the sampling process, assigning a set of connections to each destination on the first list, and dynamically updating the first list and the set of connections assigned to each destination. In an exemplary embodiment, the step of assigning a set of connections includes the steps of ranking destinations in the first list from a most frequently requested destination to a least frequently requested destination and assigning a set of request queues for a set of connections to each destination on the first list in accordance with the destination's position on the first list. In another exemplary embodiment, the step of dynamically updating the first list includes the steps of initiating a next sampling process to sample all requests, compiling a new list of frequently requested destinations based on the next sampling process, comparing the first list to the new list, updating the first list based on the comparing step, and reassigning the set of connections to each destination on the first list based on the updating step.

In one embodiment, a destination is a server identified by a domain name. In another embodiment, a destination is a database.

An exemplary computer program product for managing requests in a mobile device system comprises logic code for assigning a priority to each queue in a set of priority queues, logic code for inputting requests into the set of priority queues based on a priority associated with each request, logic code for merging multiple requests in the set of priority queues into a merged request based on priorities associated with the multiple requests and a destination for the multiple requests, and logic code for sending the merged request to a request queue for a connection in a connection pool for the destination. In an exemplary embodiment, the logic code for merging includes logic code for multiplexing the multiple requests and logic code for selectively building the merged request based on the multiplexing. In another exemplary embodiment, the logic code for sending includes logic code for sending a dummy request to extend the connection duration with the destination. In yet another exemplary embodiment, the logic code for sending includes logic code for calculating a total processing time of each request queue for each connection in the connection pool and logic code for sending a next request into a request queue having the lowest total processing time in the connection pool.

In one embodiment, the exemplary computer program product further comprises logic code for initiating a sampling process to sample all requests, logic code for compiling a first list of frequently requested destinations based on the sampling process, logic code for assigning a set of connections to each destination on the first list, and logic code for dynamically updating the first list and the set of connections assigned to each destination. In an exemplary embodiment, the logic code for assigning a set of connections includes logic code for ranking destinations in the first list from a most frequently requested destination to a least frequently requested destination and logic code for assigning a set of request queues for a set of connections to each destination on the first list in accordance with the destination's position on the first list. In another exemplary embodiment, the logic code for dynamically updating includes logic code for initiating a next sampling process to sample all requests, logic code for compiling a new list of frequently requested destinations based on the next sampling process, logic code for comparing the first list to the new list, logic code for updating the first list based on the comparing, and logic code for reassigning the set of connections to each destination on the first list based on the updating.

An exemplary apparatus for managing data in a mobile device system comprises a request receiver for receiving requests, a set of priority queues for storing the requests, a dispatch manager for dispatching the requests from the set of priority queues, and a set of request queues, each request queue being assigned to a connection. In an exemplary embodiment, requests are stored into the priority queue based on priorities associated with each request and the dispatch manager sends each of the requests into a request queue for a connection based on each request's destination. In another exemplary embodiment, the dispatch manager merges multiple requests into a merged request before sending the merged request to a request queue for a connection in a connection pool. In yet another exemplary embodiment, the dispatch manager includes multiplexors for multiplexing the multiple requests into the merged request based on priorities assigned to the multiple requests when the multiple requests are destined to the same destination.

DETAILED DESCRIPTION OF THE INVENTION

Figure 1:
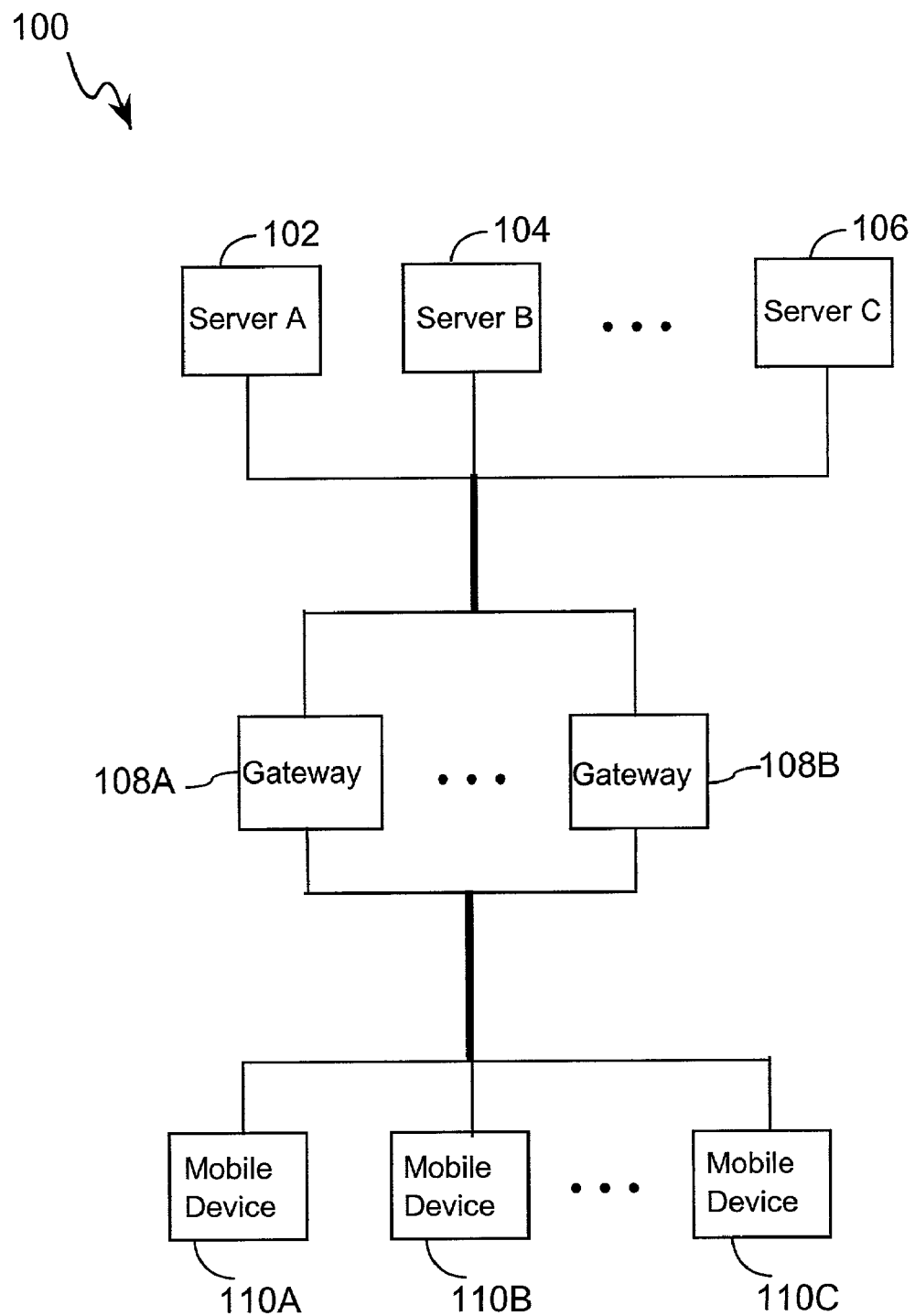
FIG. 1 schematically illustrates an exemplary queue management system in accordance with an embodiment of the invention.

FIG. 1 illustrates an exemplary prior art system 100. The system 100 includes multiple servers connected to multiple gateways that service multiple mobile devices. For ease of explanation, only a representative number of servers, gateways, and mobile devices are shown in FIG. 1. The system 100 includes server A 102, server B 104, server C 106, gateways 108A–108B, and mobile devices 110A–110C. In an exemplary embodiment, a queue management system in accordance with this invention is implemented at the gateway 108 to manage traffic between the mobile devices 110 and the servers 102–106.

Figure 2:
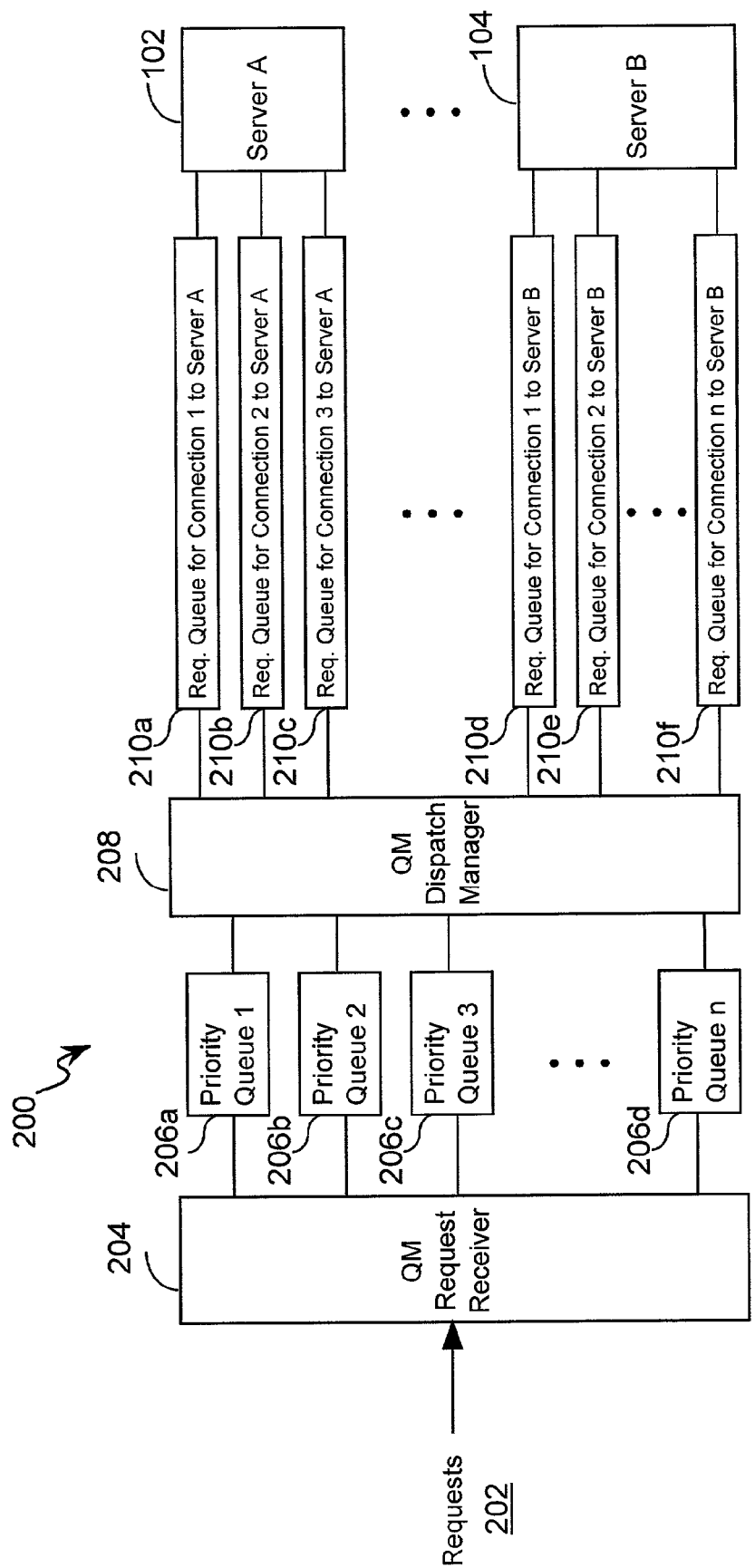
FIG. 2 schematically illustrates another exemplary queue management system in accordance with an embodiment of the invention.

FIG. 2 schematically illustrates an exemplary queue management system 200 in accordance with an embodiment of the invention. The queue management system 200 includes a request receiver 204 for receiving requests 202, multiple priority queues 206a–206d, a dispatch manager 208, and multiple request queues 210a–210f for a connection pool comprising a set of connections to servers such as server A 102 and server B 104. In an exemplary embodiment, a request queue is assigned to each connection in a connection pool. When a request 202 is received, the request receiver 204 determines the request's assigned priority in accordance with a predetermined policy. For example, a request initiated by a user (at a mobile device 110) has higher priority over a request initiated by a gateway 108. The dispatch manager 208 services priority queues 206 based on the priority assigned to each queue, such that a queue having a higher priority is serviced before another queue having a relatively lower priority. During servicing, the dispatch manager 208 places each request in a request queue 210 for a connection to a server (or Web Site) that is appropriate for the request being serviced. For example, if a user requests to be connected to server A 102 to download some data, the dispatch manager 208 will place the request in one of the request queues 210a–210c for connections to the server A 102. In an exemplary embodiment, the request receiver 204 and the dispatch manager 208 can be implemented using currently available off-the-shelf computer systems that are configured to perform data queuing functions.

Figure 3:
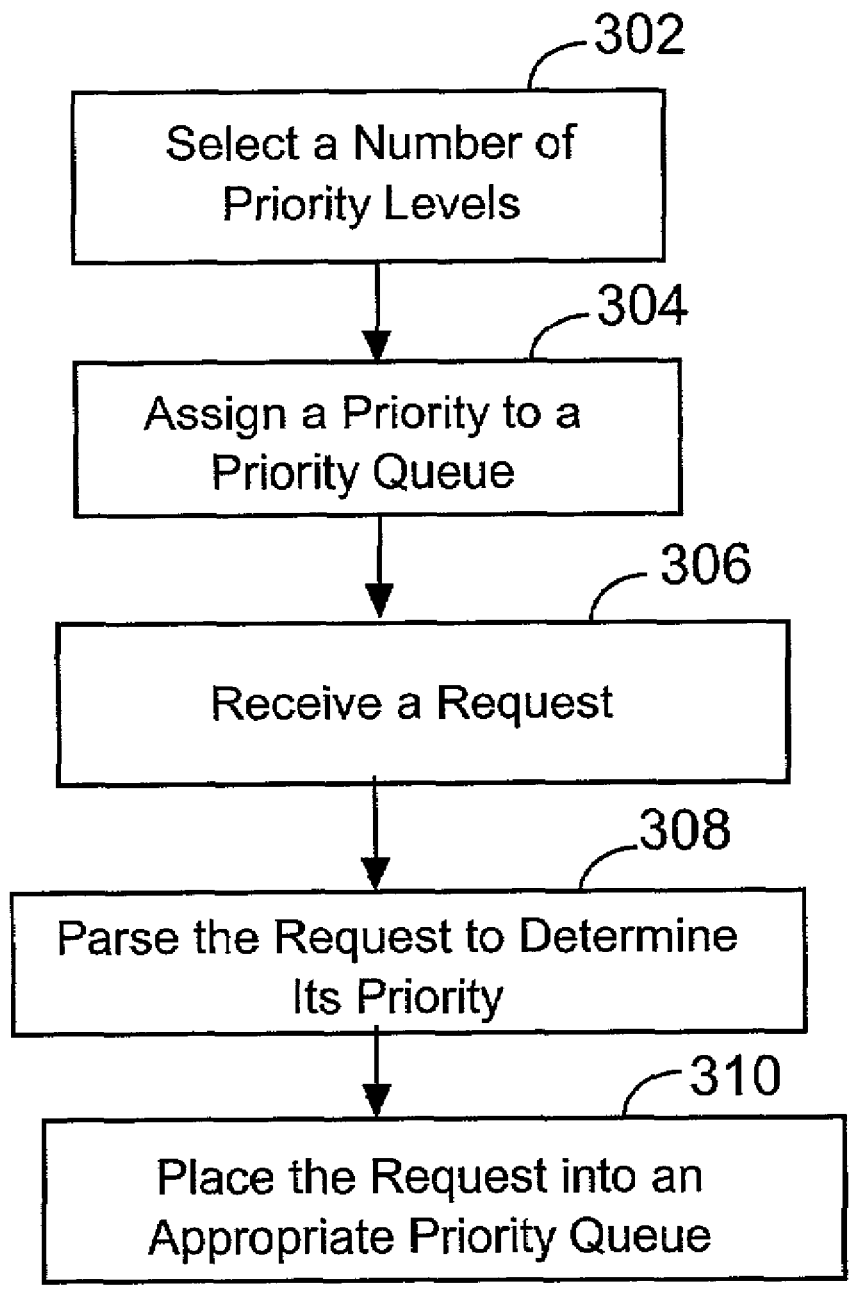
FIG. 3 illustrate an exemplary process in accordance with an embodiment of the invention.

FIG. 3 illustrates an exemplary process in accordance with an embodiment of the invention. At step 302, a number of priority levels is selected (e.g., three levels: high priority, medium priority, low priority). In one embodiment, a user can manually select a desired number of priorities. In another embodiment, a default number of priorities is provided by the software automatically. Next, each selected priority is assigned to a queue in a set of priority queues 206 (step 304). When a request 202 is received (step 306), it is parsed by the request receiver 204 to determine its priority (step 308). For example, a user initiated request has a higher priority than a gateway initiated request. Further, a user initiated status-check request may have a higher priority over a user initiated update request and a user initiated update request may have a higher priority over a user initiated download request. The request is then placed into a priority queue 206 suitable for its priority (step 310).

Figure 4:
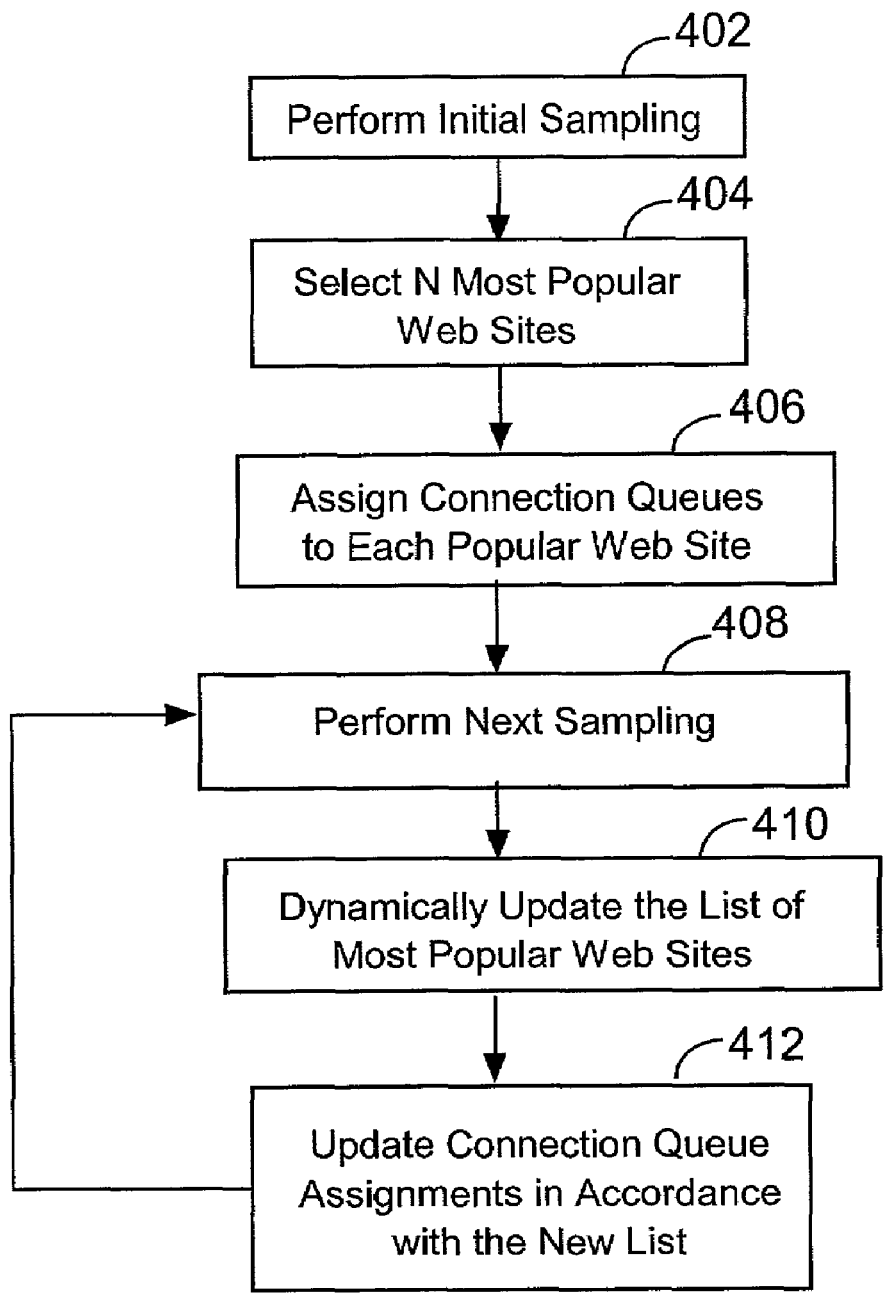
FIG. 4 illustrate another exemplary process in accordance with an embodiment of the invention.
Figure 5:
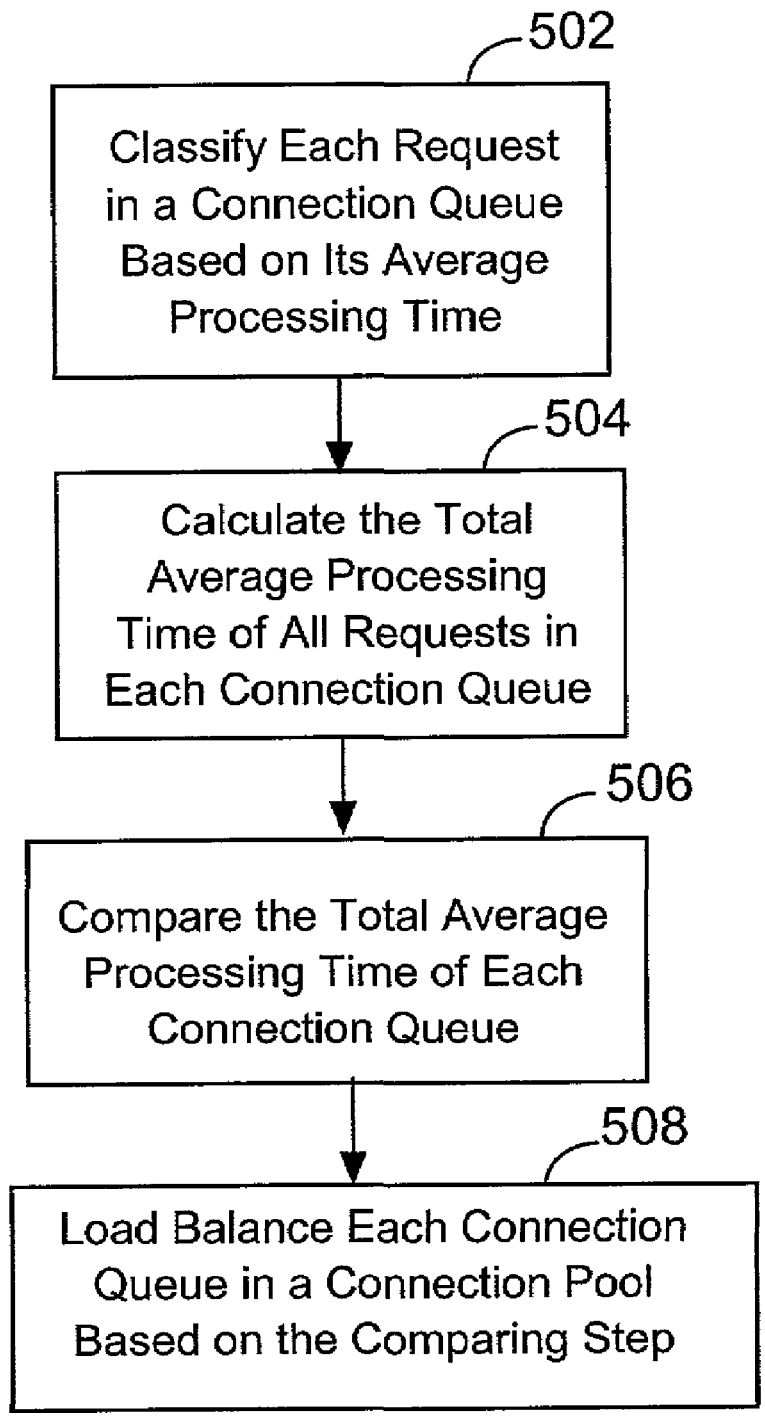
FIG. 5 illustrate yet another exemplary process in accordance with an embodiment of the invention.

Requests placed into the set of priority queues 206 are processed in turn by the dispatch manager 108, which places each request into a connection queue depending on the requested destination and the connection queue capacity. For example, each destination or Web Site (e.g., server A) is pre-assigned a connection pool comprising one or more connection queues (e.g., 5 connection queues). Thus, a request destined to server A is placed in one of the 5 connection queues. FIG. 4 below illustrates an exemplary process for determining how many connection queues should be assigned to each destination or Web Site. FIG. 5 below illustrates an exemplary process for determining which connection queue within a connection pool should receive the next request.

In an exemplary embodiment, multiple requests destined to the same Web Site can be merged into one request to improve efficiency. In one embodiment, when three request types are involved (e.g., status-check, update, and download request types) one or more requests can be merged into one request. A status-check request is a request to check the status of an application. An update request is a request to get an update for an application. A download request is a request to download an application. Thus, logically, a download request encloses both an update request and a status-check request because the latter requests ask for a subset of an application while the former request asks for the entire application. An update request encloses a status-check request because the latter request may not ask for any portion of the application at all. In an exemplary embodiment, a first request can be merged into a second request if the first request is enclosed by the second request and if the second request has the same or higher priority than the first request. In the above example, an update request and a status-check request can be merged into a download request and a status-check request can also be merged into an update request.

FIG. 4 illustrates another exemplary process in accordance with an embodiment of the invention. At step 402, an initial sampling of requests from all mobile devices 110 is performed. That is, all requests are recorded and analyzed to determine the frequency of request of each destination or Web Site. In an exemplary embodiment, the initial sampling lasts for about one hour. Next, the top N (e.g., 100) most popular destinations or Web Sites are selected based on the initial sampling (step 404). In one embodiment, a probability density Pi for each requested destination or Web Site is calculated using the following equation: $Pi=Ni/Nt$, where Ni is the number of times a Web Site "i" is requested and Nt is the total number of requests within the sampling period. A subset of the total number of available connections are assigned to each Web Site based on the Web Site's popularity (step 406). For example, the number of connections for Web Site i (Qi) is calculated using the following equation: $Qi=Pi*80\%*CQ$, where CQ is equal to the total number of available connections. In an exemplary embodiment, only 80% of the total available connections (CQ) are assigned to the most popular Web Sites; 20% of the total available connections (CQ) are reserved as idle connections that can be allocated on a first-in-first-out basis for establishing connections to other Web Sites that are not on the most popular Web Site list or to provide additional connections when assigned connections for the popular Web Sites overflow. In an exemplary embodiment, the most popular Web Site list is dynamically updated. At a predetermined time intervals (e.g., every 10 minutes), a next sampling is performed (e.g., for another one hour sampling duration) (step 408). Next, the most popular Web Site list is updated according to the next sampling (step 410). As a result of the update of the most popular Web Site list, the connection assignments are also updated (step 412). For example, if as a result of the next sampling at step 410, server A 102, which is on the most popular Web Site list, is replaced by server B 104, some or all of the connections that were originally assigned to server A 102 will get reassigned to server B 104, depending on how popular server B is (see Step 406). Steps 408–412 are repeated at every predetermined time interval (e.g., every 10 minutes) to continuously update the most popular Web Site list.

FIG. 5 illustrates yet another exemplary process in accordance with an embodiment of the invention. At step 502, all requests in a connection pool are classified based on their average processing time. For each request queue for a connection in the connection pool, calculate the total average processing time to process all of the requests in the request queue (step 504). Compare the total average processing time for each request queue in the connection pool (step 506). Load balance each request queue in accordance with the comparing (step 508). For example, the request queue with the least total average processing time should receive the next request received by the connection pool. In an exemplary embodiment, load balancing is performed only among request queues for connections to the same Web Site.

The foregoing examples illustrate certain exemplary embodiments of the invention from which other embodiments, variations, and modifications will be apparent to those skilled in the art. The invention should therefore not be limited to the particular embodiments discussed above, but rather is defined by the claims.

What is claimed is:

1. A method for managing requests in a mobile device system, comprising the steps of:
   assigning a priority to each queue in a set of priority queues;
   inputting requests into said set of priority queues based on a priority associated with each request;
   merging multiple requests in said set of priority queues into a merged request based on priorities associated with said multiple requests and a destination for said multiple requests; and
   sending said merged request to a request queue for a connection in a connection pool for said destination, wherein said sending includes sending a dummy request to extend the connection duration with said destination.

2. The method of claim 1, further comprising the steps of:
   assigning a high priority to a request if the request is user initiated; and
   assigning a low priority to a request if the request is not user initiated.

3. The method of claim 1, wherein said merging step includes the steps of:
   multiplexing said multiple requests; and
   selectively building said merged request based on said multiplexing.

4. The method of claim 1, wherein said sending step includes the steps of:
   calculating a total processing time of each request queue for each connection in said connection pool; and
   sending a next request into a request queue having the lowest total processing time in said connection pool.

5. The method of claim 1, further comprising the steps of:
   initiating a sampling process to sample all requests;
   compiling a first list of frequently requested destinations based on said sampling process;
   assigning a set of connections to each destination on said first list; and
   dynamically updating said first list and said set of connections assigned to each destination.

6. The method of claim 5, wherein said step of assigning a set of connections includes the steps of:
   ranking destinations in said first list from a most frequently requested destination to a least frequently requested destination; and
   assigning a set of request queues for a set of connections to each destination on said first list in accordance with said destination's position on said first list.

7. The method of claim 5, wherein said step of dynamically updating includes the steps of:
   initiating a next sampling process to sample all requests;
   compiling a new list of frequently requested destinations based on said next sampling process;
   comparing said first list to said new list;
   updating said first list based on said comparing step; and
   reassigning said set of connections to each destination on said first list based on said updating step.

8. The method of claim 1, wherein a destination is a server identified by a domain name.

9. The method of claim 1, wherein a destination is a database.

10. A computer program product for managing requests in a mobile device system, comprising:
    logic code for assigning a priority to each queue in a set of priority queues;
    logic code for inputting requests into said set of priority queues based on a priority associated with each request;
    logic code for merging multiple requests in said set of priority queues into a merged request based on priorities associated with said multiple requests and a destination for said multiple requests; and logic code for sending said merged request to a request queue for a connection in a connection pool for said destination, wherein said logic code for sending includes logic code for sending a dummy request to extend the connection duration with said destination.

11. The computer program product of claim 10, further comprising:

logic code for assigning a high priority to a request if the request is user initiated; and logic code for assigning a low priority to a request if the request is not user initiated.

12. The computer program product of claim 10, wherein said logic code for merging includes:

logic code for multiplexing said multiple requests; and logic code for selectively building said merged request based on said multiplexing.

13. The computer program product of claim 10, wherein said logic code for sending includes:

logic code for calculating a total processing time of each request queue for each connection in said connection pool; and logic code for sending a next request into a request queue having the lowest total processing time in said connection pool.

14. The computer program product of claim 10, further comprising:

logic code for initiating a sampling process to sample all requests;

logic code for compiling a first list of frequently requested destinations based on said sampling process;

logic code for assigning a set of connections to each destination on said first list; and logic code for dynamically updating said first list and said set of connections assigned to each destination.

15. The computer program product of claim 14, wherein said logic code for assigning a set of connections includes:

logic code for ranking destinations in said first list from a most frequently requested destination to a least frequently requested destination; and logic code for assigning a set of request queues for a set of connections to each destination on said first list in accordance with said destination's position on said first list.

16. The computer program product of claim 14, wherein said logic code for dynamically updating includes:

logic code for initiating a next sampling process to sample all requests;

logic code for compiling a new list of frequently requested destinations based on said next sampling process;

logic code for comparing said first list to said new list;

logic code for updating said first list based on said comparing; and logic code for reassigning said set of connections to each destination on said first list based on said updating.

17. An apparatus for managing data in a mobile device system, comprising:

a request receiver for receiving requests;

a set of priority queues for storing said requests;

a dispatch manager for dispatching said requests from said set of priority queues; and a set of request queues, each request queue being assigned to a connection;

wherein said requests are stored into said priority queue based on priorities associated with each request and said dispatch manager sends each of said requests into a request queue for a connection based on a destination of each request; and wherein said dispatch manager merges multiple requests into a merged request before sending said merged request to a request queue for a connection in a connection pool, wherein said sending includes sending dummy request to extend the connection duration with said destination.

18. An apparatus for managing data in a mobile device system, comprising:

a request receiver for receiving requests;

a set of priority queues for storing said requests;

a dispatch manager for dispatching said requests from said set of priority queues; and a set of request queues, each request queue being assigned to a connection;

wherein said requests are stored into said priority queue based on priorities associated with each request and said dispatch manager sends each of said requests into a request queue for a connection based on a destination of each request; and wherein said dispatch manager includes multiplexers for multiplexing said multiple requests into said merged request based on priorities assigned to said multiple requests when said multiple requests are destined to a destination, wherein said sends includes sends a dummy request to extend the connection duration with said destination.

* * * * *